United States Patent
Liu et al.

(10) Patent No.: US 10,776,248 B2
(45) Date of Patent: Sep. 15, 2020

(54) AUTOMATED SOURCE CODE WRITING STYLE EVALUATION, VALIDATION, AND MODIFICATION

(71) Applicant: INTERNATIONAL BUSINESS MACHINES CORPORATION, Armonk, NY (US)

(72) Inventors: Su Liu, Austin, TX (US); Debbie Anglin, Williamson, TX (US); Cheng Xu, Beijing (CN); WuMi Zhong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/202,427

(22) Filed: Nov. 28, 2018

(65) Prior Publication Data

US 2020/0167263 A1    May 28, 2020

(51) Int. Cl.
| | |
|---|---|
| G06F 9/44 | (2018.01) |
| G06F 11/36 | (2006.01) |
| G06F 9/54 | (2006.01) |
| G06F 8/33 | (2018.01) |

(52) U.S. Cl.
CPC ............ *G06F 11/3616* (2013.01); *G06F 8/33* (2013.01); *G06F 9/54* (2013.01)

(58) Field of Classification Search
CPC ........... G06F 8/33; G06F 9/54; G06F 11/3616
USPC .......................................... 717/110–114, 117
See application file for complete search history.

(56) References Cited

U.S. PATENT DOCUMENTS

| | | | |
|---|---|---|---|
| 5,761,689 A | 6/1998 | Rayson et al. | |
| 6,442,516 B1* | 8/2002 | Lee .......................... | G06F 9/454 704/8 |
| 8,903,710 B2* | 12/2014 | Luo ...................... | G06F 17/2854 704/2 |
| 9,348,562 B2 | 5/2016 | Balasubramanian et al. | |
| 9,489,418 B2 | 11/2016 | Brodsky et al. | |
| 2008/0195377 A1* | 8/2008 | Kato .................... | G06F 17/2836 704/8 |
| 2010/0235730 A1 | 9/2010 | Campbell et al. | |

(Continued)

OTHER PUBLICATIONS

Gregor Thurmair, "Using corpus information to improve MT quality", 2006, LREC 2006 Conference—http://www.lrec-conf.org/lrec2006/ , pp.45-48 (Year: 2006)*

(Continued)

*Primary Examiner* — Ted T. Vo
(74) *Attorney, Agent, or Firm* — Noah Sharkan; Andrew D. Wright; Roberts Calderon Safran & Cole, P.C.

(57) ABSTRACT

A computer-implemented method includes: obtaining and storing, by a computer device, a service profile defining writing style rules, scoring information, and threshold information; receiving, by the computer device, an extracted program integrated information (PII) message from a client device; determining, by the computer device, an overall validation score of the extracted PII message is less than a threshold defined by the threshold information; generating, by the computer device, a modified PII message by changing content of the extracted PII message; and returning, by the computer device, the modified PII message to the client device for replacing the extracted PII message in a source code.

19 Claims, 7 Drawing Sheets

(56) References Cited

U.S. PATENT DOCUMENTS

| | | |
|---|---|---|
| 2011/0271250 A1 | 11/2011 | Park et al. |
| 2013/0263086 A1 | 10/2013 | Carter et al. |
| 2014/0317147 A1 | 10/2014 | Wu |
| 2015/0058282 A1 | 2/2015 | Saraya |
| 2018/0232364 A1* | 8/2018 | Chang .................. G06F 3/0481 |

OTHER PUBLICATIONS

Kato et al., "Program Integrated Information ID Tag for Translation Verification Test", 2006, LREC 2006 Conference—http://www.lrec-conf.org/lrec2006/ , pp. 7-10 (Year: 2006).*

Kato et al., "A Utility for Showing Program Integrated Information Changes between Versions in a Translation Verification Test", 2008, IEEE, pp. 330-337 (Year: 2008).*

Kehn, "Sentiment Analysis a discussion with an expert", IBM, Jun. 16, 2016, 7 pages.

Unknown, "Proofread Bot", https://proofreadbot.com/, Accessed Nov. 19, 2018, 4 pages.

Unknown, "GrammarCheck", https://www.grammarcheck.net/editor/, Accessed Nov. 19, 2018, 3 pages.

Lanham et al., "Style" The Writing Center University of North Carolina at Chapel Hill, https://writingcenter.unc.edu/tips-and-tools/style/, Accessed Nov. 19, 2018, 10 pages.

Unknown, "Chapter 8: Evaluation Statistical Machine Translation", http://www.statmt.org/book/slides/08-evaluation.pdf, Accessed Nov. 19, 2018, 42 pages.

DeRespinis et al., "The IBM Style Guide Conventions for Writers and Editors", http://ptgmedia.pearsoncmg.com/images/9780132101301/samplepages/0132101300.pdf, Accessed Nov. 19, 2018, 44 pages.

Unknown, "Writing Style for messages", IBM: IBM Knowledge Center, https://www.ibm.com/support/knowledgecenter/ssw_aix_72/com.ibm.aix.nlsgdrf/write_styles.htm, Accessed Nov. 19, 2018, 2 pages.

Cali et al., "The five features of effective writing," retrieved from https://web.archive.org/web/20180203193720/http://www.learnnc.org/lp/editions/few/cover, dated Feb. 3, 2018, 2 pages.

Anonymous, "Writing for an international audience," retrieved from https://web.archive.org/web/20170421092444/https://www-01.ibm.com/software/globalization/topics/writing/style.html 1/2, dated Apr. 21, 2017, 2 pages.

* cited by examiner

143

| Detected Style Issue | Deduction Score | Example |
|---|---|---|
| Passive voice | -20 | have been... <br> is done by... |
| Future tense | -10 | will ... |
| Missing subject, object, type names | -15 | Cal vs. cal command |
| Terminology error | -5 | No. vs. number <br> xml vs. XML <br> Host name vs. Hostname <br> First name vs. given name |
| Conventional rules | -10 | (555) 555 5555 vs. 555-555-5555 |
| Negative tone | -15 | "Don't use the f option more than once" vs. "Use the –f flag only once" |

FIG. 3

```
public Object [][]_MSG123()
{
    Object[][] contents = {
        {"HealthMessageManager.WarningMessage.InputFormat",
            "WARNING111    Month and year must be entered as no."}     ← 411
        {"HealthMessageManager.ErrorMessage.NOCONFIG",
            "ERROR121        The xml configuration file could not be found"}  ← 412
        {"HealthMessageManager.UsageMessage.CAL",
            "USAGE             The cal will display a calendar"}       ← 413
    };
    return contents;
}
```

FIG. 4A

```
public Object [][]_MSG123()
{
    Object[][] contents = {
        {"HealthMessageManager.WarningMessage.InputFormat",
            "WARNING111    Enter month and year as numbers."}         ← 411'
        {"HealthMessageManager.ErrorMessage.NOCONFIG",
            "ERROR121        There are no XML configuration file"}    ← 412'
        {"HealthMessageManager.UsageMessage.CAL",
            "USAGE             The cal command can be used to display a calendar"}  ← 413'
    };
    return contents;
}
```

FIG. 4B

| Extracted PII Message | PII Type | Validation Score | Modified PII Message | |
|---|---|---|---|---|
| 411 → WARNING111 Month and year must be entered as NO. | Warning (-10) | 100-10-20-5=65 | WARNING111 Enter month and year as numbers | ← 411' |
| 412 → ERROR121 The xml configuration file could not be found. | Error (-15) | 100-15-20-5=60 | ERROR123 There are no XML configuration file. | ← 412' |
| 413 → USAGE: The cal will display a calendar. | Usage (-20) | 100-20-15-10=55 | USAGE: The cal command displays a calendar. | ← 413' |

FIG. 5

AUTOMATED SOURCE CODE WRITING STYLE EVALUATION, VALIDATION, AND MODIFICATION

BACKGROUND

The present invention relates generally to automated code validation and, more particularly, to automated source code writing style evaluation, validation, and modification.

An integrated development environment (IDE) is a software application that provides comprehensive facilities to computer programmers for software development. Natural language processing, cognitive technologies, and DevOps environments make it possible to integrate globalization and document development in an IDE. Program Integrated Information (PII) is the function of writing run time messages (e.g. warning, help, usage, error, status) for a software product. Globalization enablement features are used in processing data in a correct format, language, and information. Machine translation (MT) is an automatic translation tool used to translate information content from a first language to a second language.

SUMMARY

In a first aspect of the invention, there is a computer-implemented method including: obtaining and storing, by a computer device, a service profile defining writing style rules, scoring information, and threshold information; receiving, by the computer device, an extracted program integrated information (PII) message from a client device; determining, by the computer device, an overall validation score of the extracted PII message is less than a threshold defined by the threshold information; generating, by the computer device, a modified PII message by changing content of the extracted PII message; and returning, by the computer device, the modified PII message to the client device for replacing the extracted PII message in a source code.

In another aspect of the invention, there is a computer program product including a computer readable storage medium having program instructions embodied therewith. The program instructions are executable by a computer device to cause the computer device to: receive an extracted program integrated information (PII) message from a client device; determine an overall validation score of the extracted PII message is less than a threshold defined by stored threshold information; generate a modified PII message by changing content of the extracted PII message; proofread the modified PII message; and accept or decline the modified PII message based on the proofreading. Accepting the modified PII message results in the computer device returning the modified PII message to the client device for replacing the extracted PII message in a source code. Declining the modified PII message results in the computer device adjusting one or more system parameters based on the declining.

In another aspect of the invention, there is system including a processor, a computer readable memory, and a computer readable storage medium. The system includes: program instructions to store a service profile defining writing style rules, scoring information, and threshold information; program instructions to receive an extracted program integrated information (PII) message from a client device; program instructions to determine an overall validation score of the extracted PII message is less than a threshold defined by the threshold information; program instructions to generate a modified PII message by changing content of the extracted PII message; program instructions to proofread the modified PII message; and program instructions to accept or decline the modified PII message based on the proofreading. Accepting the modified PII message results in the computer device returning the modified PII message to the client device for replacing the extracted PII message in a source code. Declining the modified PII message results in the computer device adjusting one or more system parameters based on the declining. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 3 shows an exemplary score table in accordance with aspects of the invention.

FIGS. 4A and 4B show an exemplary use case in accordance with aspects of the invention.

FIG. 5 illustrates determining a validation score in accordance with aspects of the invention.

DETAILED DESCRIPTION

Figure 1:
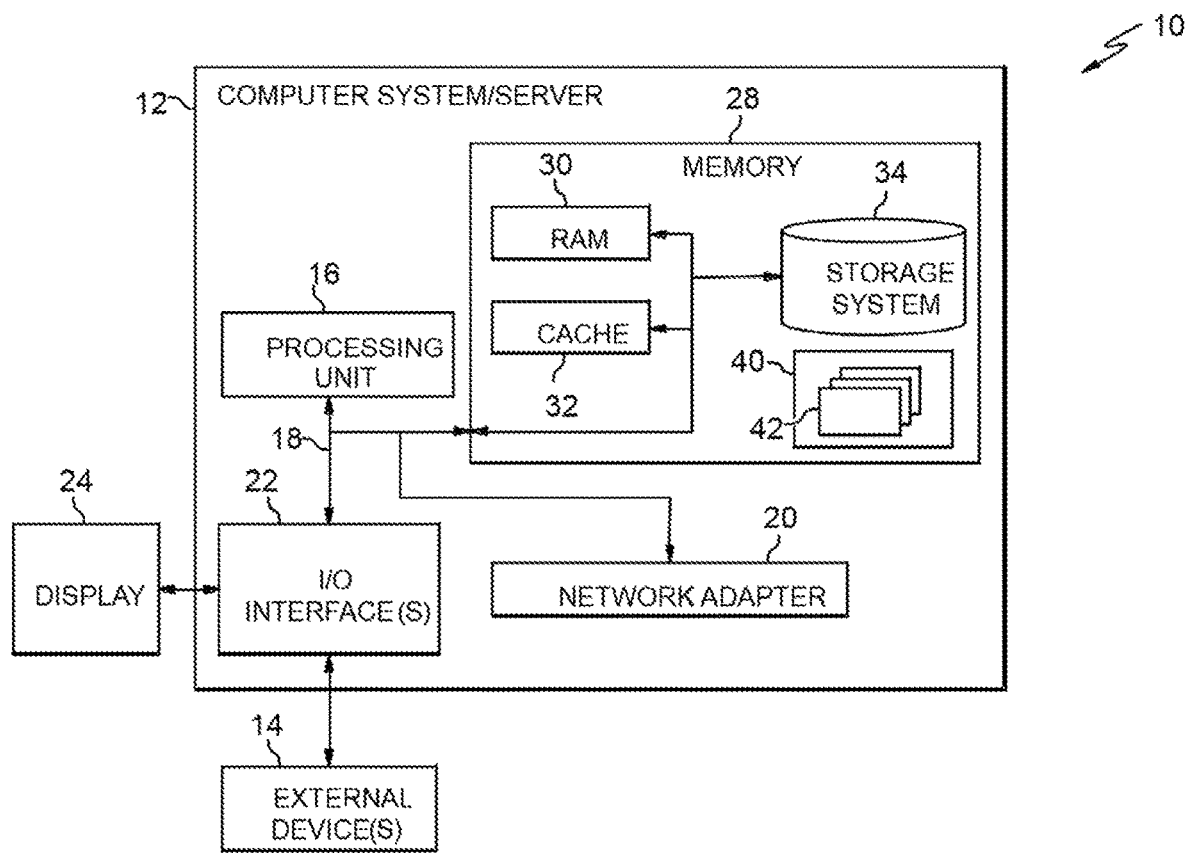
FIG. 1 depicts a computer infrastructure according to an embodiment of the present invention.

The present invention relates generally to automated code validation and, more particularly, to automated source code writing style evaluation, validation, and modification. According to aspects of the invention there is an aggregating writing-style evaluation and validation service for providing single validation reports for validating Program Integrated Information (PII) content in source code. In embodiments, the method provides a real time writing-style normalization service based on the validation report. In embodiments, the method integrates dynamic writing-style validation and normalization together as a service provided in an Integrated Development Environment (IDE). In embodiments, the method includes a cognitive insight improvement loop to received feedback from a product development and users, so that the method refines both validation and normalization modules based on writing style correction processes and generate new style rules.

Checking writing style is often a mandatory step in code validation. Enterprises that develop software typically define detailed and complicated standards and rules for validating writing-style before and after PII work. For instance, PII developers typically provide documents or word lists to a terminology team for verifying and approving. The terminology team, in turn, might be tasked with assisting another enterprise group (e.g., acquisitions) with harmonizing their software terms with other products and in adopting terminology tools and processes. The terminology team may also be tasked with ensuring cross-product harmonization with respect to terms used in software. As a result, terminology management (e.g., evaluating and managing the terms used in various enterprise software applications) is a useful component of PII strategy.

Some PII tools check the spelling, style, and terminology used in software applications. Some PII tools check terminology policies, guidelines, and rules to find incorrect terms names, new terms, or invalid phrases. However, many source code writing style issues are not easy to detect and fix. Moreover, there are too many different standards, different guidelines, different rules, and different tools for validating writing style of source code of software applications, such that it is not clear for software developers which of the plural options to apply to a given project.

There are no conventional systems that integrate PII related tools into an IDE. This is due to the following issues that limit the use of PII on an IDE: PII checking is error prone and time consuming on terminology validation and normalization; there is no framework to support an effective proofreading service on PII; there is no proactive PII term validation service in an IDE; there is no proactive PII term normalization service in an IDE; there is no intelligent method to manage PII data and configuration settings of validation and normalization; there are no self-diagnose and refinement features; and there is no "Pay As You Go" application program interface (API) for providing PII services to an IDE user.

In addition, some writing style issues in source code are not related to spelling, terminology, grammar, mood, or tone. As a result, there is no ideal method to integrate all the different writing style validation and normalization techniques into an IDE due to complexity. Therefore, there exists a need for a writing-style normalization service for reducing PII errors in information design and development in multiple levels (e.g. multi-level writing style proofreading on validation-suggestion-normalization).

Implementations of the invention address this need by providing a system and method that: provides a dynamic writing-style evaluation, validation and normalization service (DWSVNS) framework and set of SaaS (Software as a Service) APIs to help information developers create correct PII messages in source code in an IDE; defines a set of evaluating-validating criteria and a normalizing threshold based on recommended writing-style standards on each product PII service; defines a writing style validation score table for digitizing the PII quality; detects PII content (e.g., newly generated PII messages or modified existing PII messages) from product source code; extracts the detected PII content; categorizes the PII content into a PII category (e.g., warning, error, help and usage instruction, status report, etc.); sends the PII content to a writing style validation service; validates the PII content on an aggregated writing style validator; normalizes the PII content according to the writing-style category and normalization threshold; updates returned normalized content either for proofreading by PII experts or for shipping; and compares human corrected content to normalized content to allow the system to learn the change and then adjust the validation and normalization modules.

Embodiments of the invention improve the technology of code validation by providing users with automated tools that evaluate, validate, and modify PII messages in source code of software products. Embodiments of the invention employ an unconventional arrangement of steps including: obtaining and storing, by a computer device, a service profile defining writing style rules, scoring information, and threshold information; receiving, by the computer device, an extracted program integrated information (PII) message from a client device; determining, by the computer device, an overall validation score of the extracted PII message is less than a threshold defined by the threshold information; generating, by the computer device, a modified PII message by changing content of the extracted PII message; and returning, by the computer device, the modified PII message to the client device for replacing the extracted PII message in the source code. The steps themselves are unconventional, and the combination of the steps is also unconventional. For example, the steps of determining an overall validation score of the extracted PII message and generating a modified PII message by changing content of the extracted PII message create new information that does not otherwise exist, and this new information is then used in subsequent steps in an unconventional manner.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
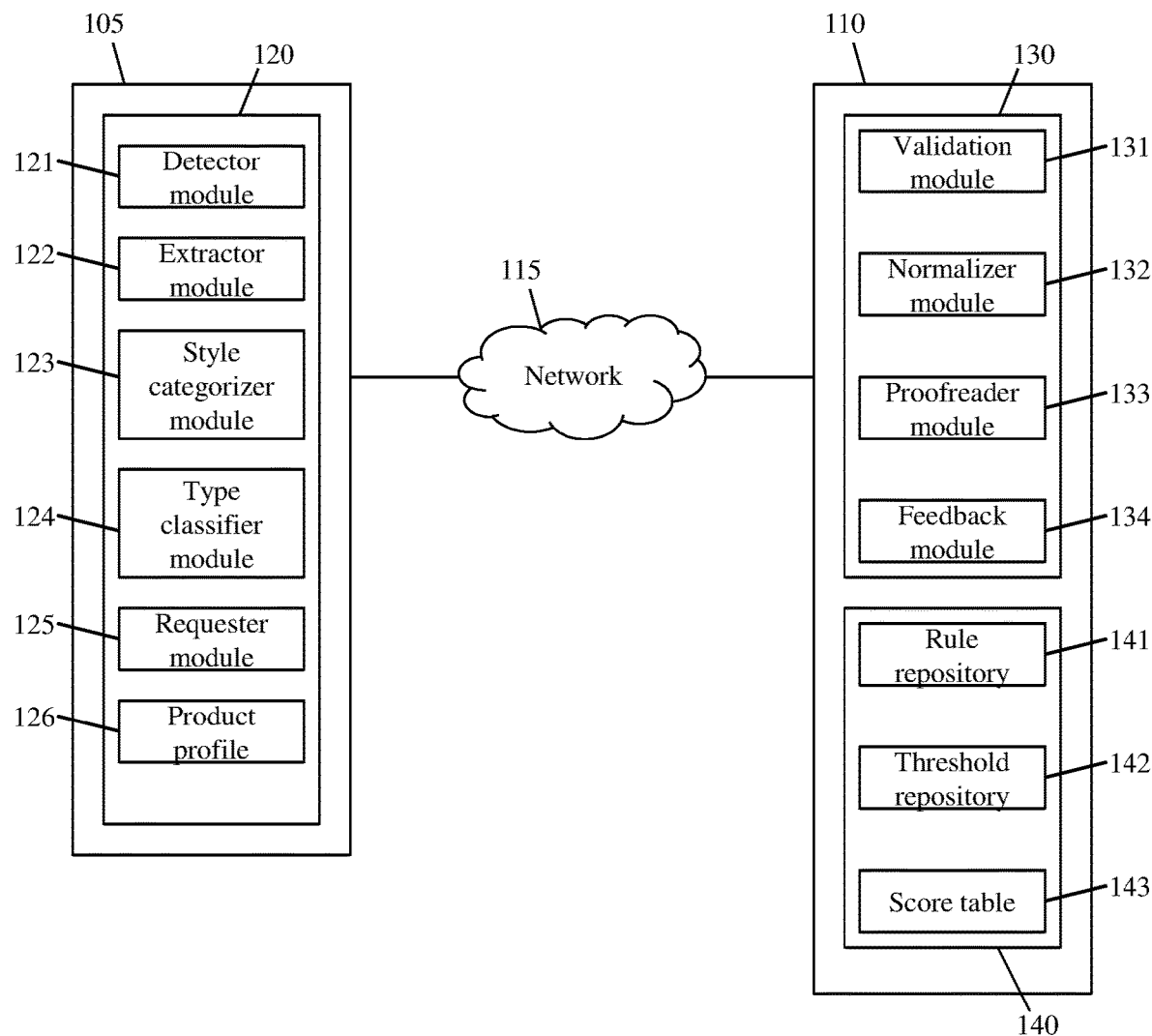
FIG. 2 shows a block diagram of an exemplary environment in accordance with aspects of the invention.

FIG. 2 shows a block diagram of an exemplary environment in accordance with aspects of the invention. The environment includes a client device 105 in communication with a server 110 via a network 115. In embodiments, the network 115 comprises a communication network such as a LAN, WAN, or the Internet, or a combination of such communication networks. The quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, the client device 105 is a computer device such as a desktop computer, laptop computer, tablet computer, etc., and comprises one or more elements of the computer system 12 of FIG. 1. In embodiments, the client device 105 stores and runs an integrated development environment (IDE) 120, which is a software application that provides comprehensive facilities to computer programmers for software development. In accordance with aspects of the invention, the IDE 120 is configured to detect and extract a PII message from code (e.g., source code), categorize the PII message, send the categorized PII message to the server 110 (e.g., via an API call), received a modified PII message from the server 110, and insert the modified PII message in the code (e.g., in place of the original, extracted PII message).

In embodiments, the IDE 120 comprises a detector module 121, an extractor module 122, a style categorizer module 123, a type classifier module 124, a requester module 125 and a product profile 126. Each of the modules 121-125 comprises one or more program modules 42 as described with respect to FIG. 1. The IDE 120 may include additional or fewer modules than those shown in FIG. 2. In embodiments, separate modules may be integrated into a single module. Additionally, or alternatively, a single module may be implemented as multiple modules.

In accordance with aspects of the invention, the product profile 126 is a file that includes a set of product information about the code being analyzed. In embodiments, the product information in the product profile 126 comprises at least one of: product ID; supported languages; default PII language (e.g., English, Chinese, etc.); encode (e.g., ASCII, Unicode, etc.); locale; PII path; and software application type (e.g., operating system, GUI application, hardware management, network configuration, security control, and monitor tool).

According to aspects of the invention, the detector module 121 is configured to analyze the code for PII content. In embodiments, the detector module 121 monitors changes to the code to identify new PII messages, e.g., PII content that has been newly added to the code, or that has been updated or modified by users such as software developers and/or PII writers.

According to aspects of the invention, the extractor module 122 is configured to extract PII content from the code. In embodiments, the extractor module 122 extracts the new PII messages detected by the detector module 121.

According to aspects of the invention, the style categorizer module 123 is configured to categorize the extracted PII message as one of a plurality of predefined styles. In embodiments, the categories comprise: GUI elements (menu name, button name); popup dialog; and tooltip help. In embodiments, the style categorizer module 123 categorizes the extracted PII message into one of the styles based on factors including at least one of: data in the product profile 126; source code; application types (e.g., operating system, office tools, financial enterprise application; health management application); served users; and development styles.

According to aspects of the invention, the type classifier module 124 is configured to classify the extracted PII message as one of a plurality of predefined types. In embodiments, the types include: warning; error; help and usage; and status report. In embodiments the type classifier module 124 categorizes the extracted PII message as one of the types based on factors including at least one of: PII message content; source code syntax; PII rules; and related variable names. For instance, a PII message may include "USAGE:" a variable name may be "ERROR" and subroutine name may be "Show LPAR Status ( )". In embodiments, different PII types (e.g., warning; error; help and usage; and status report) have different validation scores because of importance. For instance, a set of usage messages may be used more frequently than those warring messages in certain products, in which case the usage messages are set to have higher validation scores than others.

According to aspects of the invention, the requester module 125 is configured to send the extracted PII message (from the extractor module 122), the determined style (from the style categorizer module 123), and the determined type (from the type classifier module 124) to the server 110. In embodiments, the requester module sends this information as part of an application program interface (API) call to the server 110.

In embodiments, the server 110 is a computer device comprising one or more elements of the computer system 12 of FIG. 1. In embodiments, the server 110 stores and runs a Dynamic Writing Style Validation and Normalization Service (DWSVNS) program 130 that provides PII content writing style evaluation and normalization as a service to client devices. In particular embodiments, the server 110 is a node in a cloud computing environment and the services performed by the server are provided to clients as Software as a Service (Saas).

In accordance with aspects of the invention, the DWSVNS program 130 comprises a validation module 131, a normalizer module 132, a proofreader module 133, and a feedback module 134. The DWSVNS program 130 and each of the modules 131-134 comprises one or more program modules 42 as described with respect to FIG. 1. The DWSVNS program 130 may include additional or fewer modules than those shown in FIG. 2. In embodiments, separate modules may be integrated into a single module. Additionally, or alternatively, a single module may be implemented as multiple modules.

In accordance with aspects of the invention, the validation module 131 is configured to analyze the extracted PII message and to determine a validation score of the extracted PII message based on the analysis. In embodiments, the validation module 131 includes plural different validation submodules, each of which separately analyzes a different style aspect of the extracted PII message. In embodiments, the style aspects include: term; tone; grammar; sentiment; tone consistency; and verb validation features. In embodiments, the analysis performed by a respective validation submodule comprises determining whether the PII message includes one or more predefined style issues associated with the style aspect of the validation submodule. For example, a tone validation submodule analyzes the extracted PII message using tone analysis to determine a tone of the extracted PII message, and determines whether the determined tone matches any one or more predefined style issues associated with tone (e.g., anger, fear, joy, sadness, tentative, etc.). In another example, a sentiment validation submodule analyzes the extracted PII message using sentiment analysis to determine a sentiment of the extracted PII message, and determines whether the determined sentiment matches any one or more predefined style issues associated with sentiment (e.g., negative, etc.).

In embodiments, the validation submodules are based on (e.g., derived from) writing style rules defined in a rule repository 141. Each of the validation submodules may comprise one or more program modules 42 as described with respect to FIG. 1.

In implementations, the validation module 131 determines an overall validation score for the extracted PII message based on the outputs of the validation submodules. In embodiments, the validation module 131 determines the overall validation score using predefined scoring factors associated with each of the predefined style issues. In embodiments, the predefined scoring factors are stored in a score table 143, an example of which is shown in FIG. 3. In the score table 143 shown in FIG. 3, the column labeled "Detected Style Issue" includes a list of all the predefined style issues that the respective validation submodules look for in the extracted PII message. The center column ("Deduction Score") indicates a numerical score associated with each one of the predefined style issues. The right column ("Example") provides examples in comment form. The score table 143 shown in FIG. 3 is merely an illustrative example. Implementations of the invention may use a score table having a different number and different types of detected style issues, and may also use deduction scores different than those shown.

As depicted in the score table 143 shown in FIG. 3, each detected instance of passive voice in the extracted PII message results in a deduction score of −20 points. Similarly, each detected instance of future tense in the extracted PII message results in a deduction score of −10 points, each detected instance of missing and subject object type names in the extracted PII message results in a deduction score of −15 points, each detected instance of a terminology error in the extracted PII message results in a deduction score of −5 points, each detected instance of a conventional rule error in the extracted PII message results in a deduction score of −10 points, and each detected instance of negative tone in the extracted PII message results in a deduction score of −15 points. In embodiments, the validation module 131 determines the overall validation score for the extracted PII message by subtracting these deduction scores from a baseline score for each detected style issue in the extracted PII message.

In embodiments, the validation module 131 determines the overall validation score for the extracted PII message also by subtracting a respective predefined amount based on the determined type of the extracted PII message (e.g., warning, error, help and usage, and status report). In one example implementation, the validation module 131 deducts 10 points from the baseline score when the extracted PII message is a warning message, 15 points when the extracted PII message is an error message, and 20 points when the extracted PII message is a help and usage message. These deduction values are exemplary, and other values may be used in other implementations.

Referring back to FIG. 2, in accordance with aspects of the invention, the normalizer module 132 is configured to generate a modified PII message from the extracted PII message when the overall validation score for the extracted PII message is less than a predefined threshold value (stored in the threshold repository 142). In embodiments, the normalizer module 132 uses rules (stored in the rule repository 141) to replace content of the extracted PII message that results in a detected style issue with normalized content. In one example, the normalizer module 132 replaces "xml" in the extracted PII message with "XML" based on a rule. In another example, the normalizer module 132 replaces "after the compile" in the extracted PII message with "after the completion" based on another rule (e.g., a rule comprising a normalization pattern based on "AFTER THE+[NOUN]"). These rules are exemplary, and any number and type of rules may be used in other implementations of the invention.

In accordance with aspects of the invention, the proofreader module 133 is configured to proofread the modified PII message that is output by the normalizer module 132. In embodiments, the proofreader module 133 uses automated proofreading techniques to proofread the modified PII message for grammar, etc. In embodiments, the proofreader module 133 is configured to perform machine learning based on input from human users that also review the modified PII message.

Still referring to FIG. 2, in accordance with aspects of the invention, the feedback module 134 is configured to receive feedback about the modified PII message from human users, and to reconfigure system parameters based on the feedback. In embodiments, the feedback module 134 receives the feedback via the IDE 120 after the modified PII message (e.g., output by the normalizer module 132) is returned to the IDE 120 for replacing the extracted PII message in the code. In embodiments, the feedback module 134 uses machine learning techniques to automatically adjust one or more system parameters based on the feedback. In one exemplary embodiment, the system parameters include: rules defined in the rule repository 141 (e.g., that are used to replace content in the modified PII message); threshold values in the threshold repository 142 (e.g., that are used to determine when to generate a modified PII message); scores in the score table 143 (e.g., that are used to determine the overall validation score of an extracted PII message); and rules and/or algorithms in the validation module (e.g., that are used to detect style issues in the extracted PII message).

The following is an exemplary use case that illustrates a machine learning aspect of the feedback module 134. In this use case, the feedback module 134 detects a customer defect related to the PII message "IMPORT the data" is not correct because of a rule indicating that "IMPORT" in all capital letters is a command name that cannot be used as a verb in any PII message. Based on detecting this style issue, the normalizer module 132 generates a modified PII message of "To import the data, use the IMPORT command." Based on these occurrences, the feedback module 134 reconfigures one or more system parameters by adding a new validation rule (e.g., "check if there are any command/application names are used as verb") and by updating the normalization rules related to this style defect.

With continued reference to FIG. 2, in accordance with aspects of the invention, the server 110 comprises a service profile 140. In embodiments, the service profile 140 is a database that stores data defining system configuration settings and variables. In embodiments, the service profile 140 includes: the rule repository 141 (e.g., a set of writing style check lists, restrictions, and recommendations for choosing a correct tone, verb, adjective, name, expression, conventional term, etc.); the threshold repository (e.g., a set of normalization thresholds for different types of PII, software and service domains, and correlated validation scores); and the score table 143 (e.g., one or more tables that list predefined style issues and correlated deduction scores).

FIGS. 4A and 4B show an exemplary use case according to aspects of the invention. Steps of the use case are described with reference to elements depicted in FIG. 2.

FIG. 4A shows source code 405 before analysis and modification by the DWSVNS program 130, and FIG. 4B shows the source code 405' after analysis and modification by the DWSVNS program 130. In accordance with aspects of the invention, the detector module 121 and the extractor module 122 detect and extract a first PII message 411, a second PII message 412, and a third PII message 413 from the source code 405. In accordance with aspects of the invention, the style categorizer module 123 determines a style of each of the extracted PII messages 411-413, and the type classifier module 124 determines a type of each of the extracted PII messages 411-413. In accordance with aspects of the invention, the requester module 125 sends an API call to the server 110, the API call including the extracted PII messages 411-413 and the determined style and type of each of the extracted PII messages 411-413. In accordance with aspects of the invention, the DWSVNS program 130 analyzes each of the extracted PII messages 411-413 (e.g., using techniques described herein) and generates modified PII messages 411', 412' and 413'. In accordance with aspects of the invention, the DWSVNS program 130 returns the modified PII messages 411'-413' to the IDE 120, which modifies the source code 405' by replacing the extracted PII messages 411-413 with the modified PII messages 411'-413'.

FIG. 5 illustrates determining an overall validation score in accordance with aspects of the invention. FIG. 5 shows a table 500 in which the first column lists the extracted PII messages 411-413 (from FIG. 4A). The second column lists the deduction for the determined type of each of the extracted PII messages. For example, the first extracted PII message 411 is determined to be a "warning" message (e.g., by type classifier module 124) and is assigned a score modifier of −10 based on this type. Similarly, the second extracted PII message 412 is determined to be an "error" message (e.g., by type classifier module 124) and is assigned a score modifier of −15 based on this type. Similarly, the third extracted PII message 413 is determined to be a "usage" message (e.g., by type classifier module 124) and is assigned a score modifier of −20 based on this type.

Still referring to FIG. 5, the third column of the table 500 depicts determining the overall validation score using the baseline score (e.g., 100 in this example) and the deduction scores. The first extracted PII message 411 receives a deduction score of −20 based on detected passive voice (e.g., "must be entered") and a deduction score of −5 for a terminology error (e.g., "NO." instead of "numbers"). In embodiments, the validation module 131 determines the deduction score for each detected style issue from the score table 143 shown in FIG. 3. As shown in the table 500, the overall validation score of the first extracted PII message 411 is the baseline score (100) adjusted by the type score deduction (−10), the passive score deduction (−20), and the terminology score deduction (−5). In accordance with aspects of the invention, based on the overall validation score being less than a threshold value, the normalizer module 132 generates the first modified PII message 411' by replacing certain content in the first extracted PII message 411 (e.g., by replacing and/or re-writing content associated with the detected style issues). For example, the normalizer module 132 replaces "Month and year must be entered . . . " with "Enter month and year . . . ." Also in this example, the normalizer module 132 replaces " . . . as NO." with "as numbers."

As further shown in FIG. 5, the second extracted PII message 412 receives a deduction score of −20 based on detected passive voice (e.g., "could not be found") and a deduction score of −5 for a terminology error (e.g., "xml" instead of "XML"). As shown in the table 500, the overall validation score of the second extracted PII message 412 is the baseline score (100) adjusted by the type score deduction (−15), the passive score deduction (−20), and the terminology score deduction (−5). In accordance with aspects of the invention, based on the overall validation score being less than a threshold value, the normalizer module 132 generates the second modified PII message 412' by replacing certain content in the second extracted PII message 412.

As further shown in FIG. 5, the third extracted PII message 413 receives a deduction score of −20 based on a detected missing subject/object/type name (e.g., "cal" should be followed by "command") and a deduction score of −10 for detected future tense (e.g., "will"). As shown in the table 500, the overall validation score of the third extracted PII message 413 is the baseline score (100) adjusted by the type score deduction (−20), the missing subject/object/type name score deduction (−15), and the future tense score deduction (−10). In accordance with aspects of the invention, based on the overall validation score being less than a threshold value, the normalizer module 132 generates the third modified PII message 413' by replacing certain content in the third extracted PII message 413.

Figure 6:
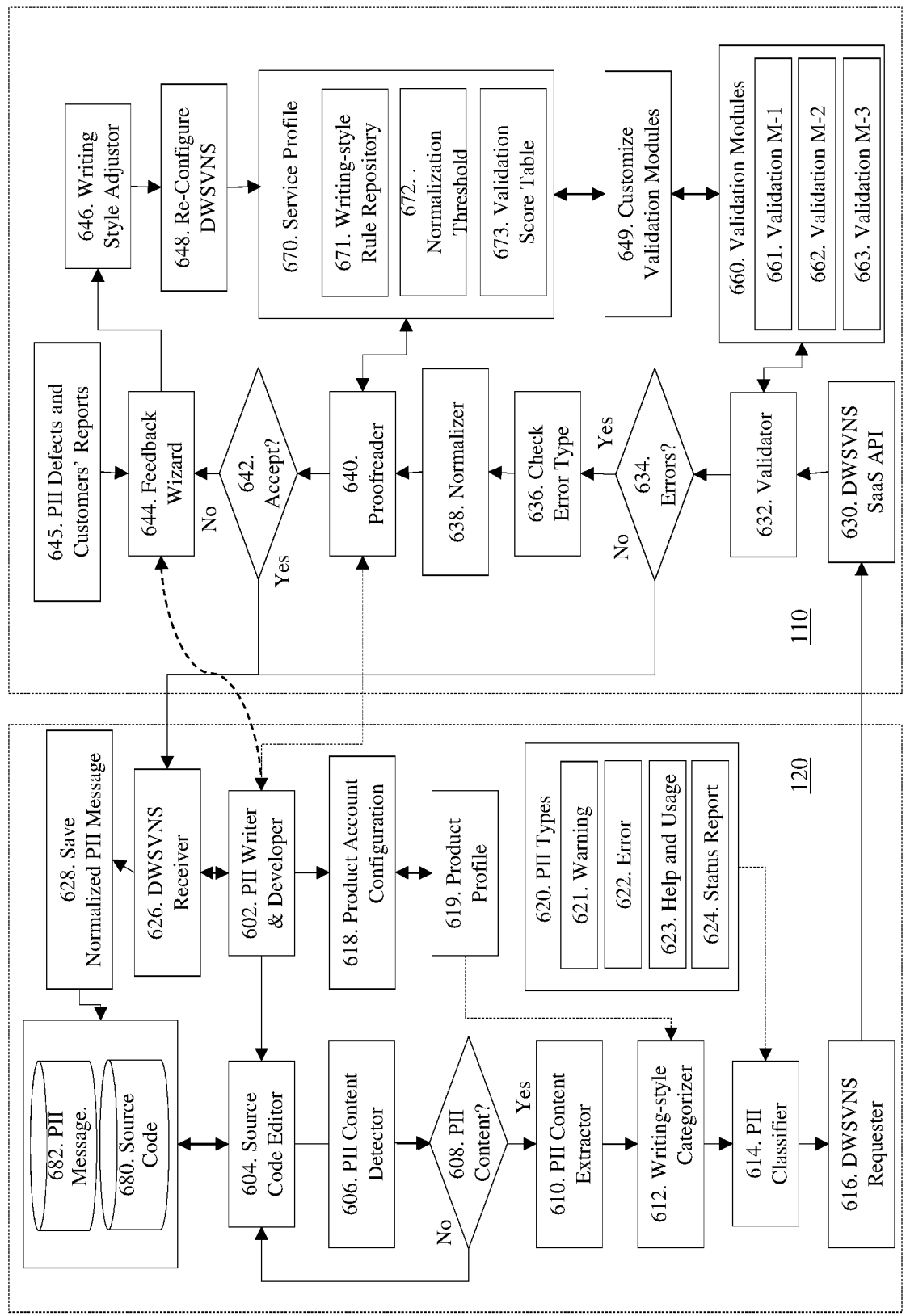
FIG. 6 shows a functional block diagram in accordance with aspects of the invention.

FIG. 6 shows a functional block diagram in accordance with aspects of the present invention. The block diagram is described with reference to elements depicted in FIG. 2, and illustrates elements of, and functions performed by, the IDE 120 and the server 110.

Block 602 represents input received from a user of the IDE 120, such as a PII writer and/or a software developer. In embodiments, the user input is received via a user interface (UI) of the IDE 120, the UI being displayed on a display of the client device 105. Bock 604 represents a source code editor of the IDE 120, which may include the UI. The source code editor is where a user generates new source code and/or edits existing source code, including PII content such as PII messages. Block 606 represents a PII content detector that corresponds to the detector module 121. Block 608 is a decision block for determining whether PII content is detected in the code, e.g., determined by the detector module 121.

Block 610 represents a PII content extractor (e.g., corresponding to extractor module 122) that extracts the PII content detected at block 606. Block 612 represents a writing style categorizer (e.g., corresponds to the style categorizer module 123) that categorizes a style of the extracted PII message from block 610. Block 614 represents a PII classifier (e.g., corresponding to the type classifier module 124) that determines a type of extracted PII message from block 610. The PII types are defined at block 620 as warning 621, error 622, help and usage 623, and status report 624. Block 618 represents product account configuration information and block 619 represents product profile information, each of which may be defined by a user via input at block 602. Block 616 represents a DWSVNS requester (e.g., corresponding to the requester module 125) that sends a request the server 110, the request including the extracted PII message, the determined style, the determined type, and any additional information.

Still referring to FIG. 6, block 630 represents a DWSVNS SaaS API (e.g., corresponding to a module of the DWSVNS program 130) that receives the API call from the IDE 120. Block 632 represents a validator (e.g., corresponding to validation module 131) that determines an overall validation score for the extracted PII message. Block 634 is a decision block for determining whether the overall validation score for the extracted PII message is less than a threshold. If the overall validation score for the extracted PII message is greater than a threshold, then the extracted PII message is deemed to not have any style issues (e.g., no style errors), and the server 110 returns the extracted PII message to the IDE 120 at block 626, which represents a DWSVNS receiver (e.g., corresponding to a module of the IDE 120 that receives the response of the API call). If the overall validation score for the extracted PII message is less than the threshold, then the extracted PII message is deemed to have a style issue (e.g., one or more style errors), in which case the process proceeds to block 636 that represents checking the error type (e.g., warning message, error message, etc.).

Block 638 represents a normalizer (e.g., corresponding to the normalizer module 132) that generates the modified PII message (e.g., by changing certain content of the extracted PII message). Block 640 represents a proofreader (e.g., corresponding to the proofreader module 133) that proofreads the modified PII message. Block 642 is a decision block for determining whether to accept the modified PII message based on the automated proofreading performed by the proofreader module 133 and/or input provided by a user at block 602 (e.g., based on the modified PII message being presented to the user for review prior to acceptance as indicated by the dashed line between block 602 and block 640). If the modified PII message is accepted, then the server 110 returns the modified PII message to the IDE 120 at the DWSVNS receiver block 626. Block 628 represents saving the modified PII message in the source code, and corresponds to a module of the IDE 120 that modifies the source code by replacing the extracted PII message with the modified PII message. The source code is represented as being saved at block 680 and the PII message at block 682.

Referring back to block 642, if the modified PII message is not accepted, then the process proceeds to block 644. Block 644 represents a feedback wizard (e.g., corresponding to the feedback module 134) that adjusts one or more system parameters based on feedback received from the user input at block 602. Block 645 represents PII defects and customers reports information that may also be used by the feedback module 134 to adjust one or more system parameters. Block 646 represents a writing style adjustor and block 648 represents a DWSVNS reconfigure module, each of which performs one or more functions of the feedback module 134 with respect to adjusting one or more system parameters based on feedback received at block 602 and/or block 645.

Block 670 represents a service profile (e.g., the service profile 140) that includes a writing style rule repository 671 (e.g., corresponding to the rule repository 141), a normalization threshold 672 (e.g., corresponding to the threshold repository 142), and a validation score table 673 (e.g., corresponding to the score table 143). Block 649 represents customizing validation modules based on the contained in the service profile 140. Block 660 represents the stored validation modules including validation M−1 at block 661, validation M−2 at block 662, and validation M−3 at block 663, each of which correspond to the validation submodules used by the validation module 131 as described with respect to FIG. 2.

Figure 7:
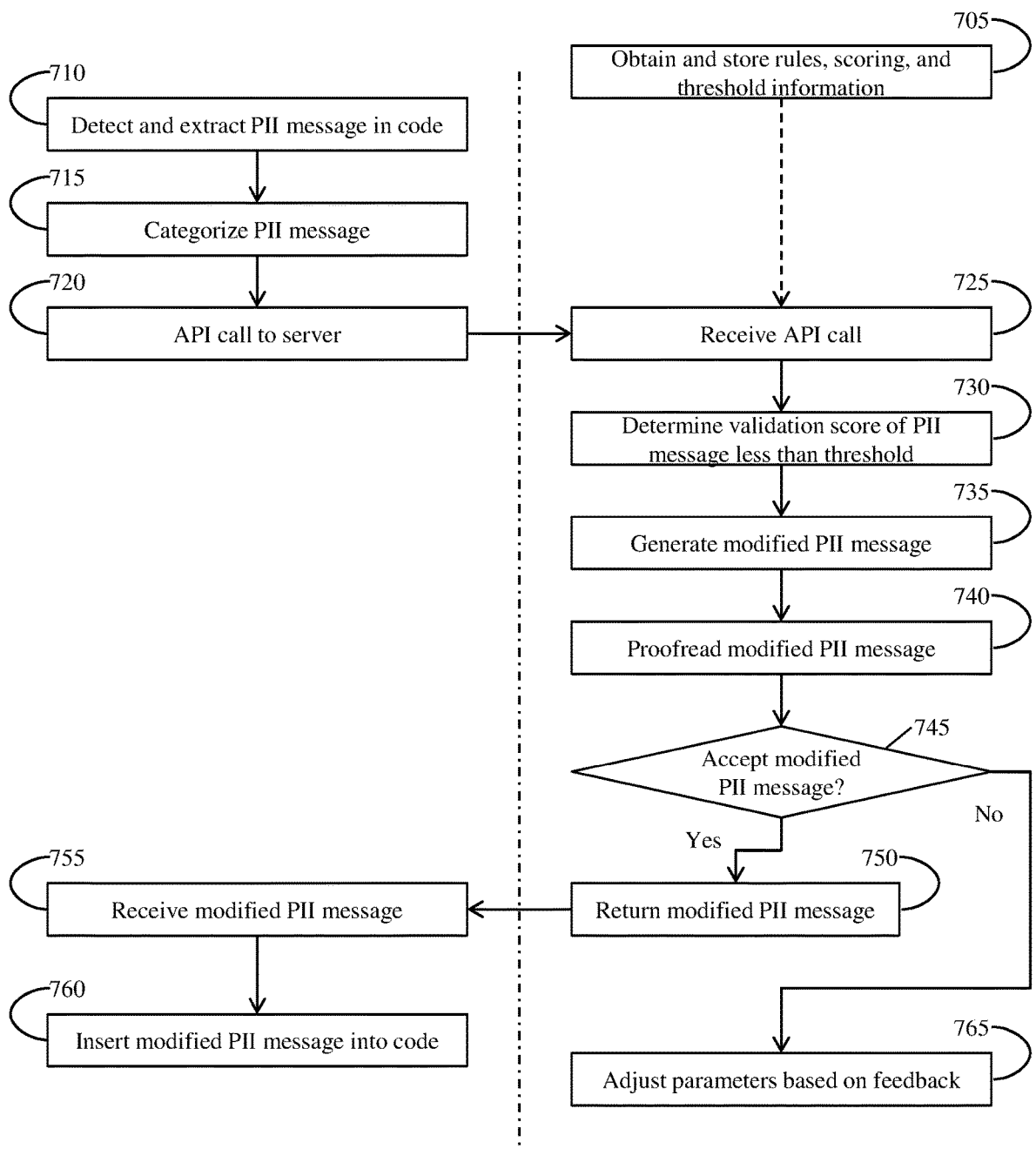
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 2 and are described with reference to elements depicted in FIG. 2. In embodiments, the IDE 120 performs the steps on the left side of the vertical dash-dot line, and the server 110 performs the steps on the right side of the line.

At step 705, the system obtains and stores writing style rules, scoring, and threshold information. In embodiments, and as described with respect to FIG. 2, the DWSVNS program 130 obtains and stores the service profile 140 including: the rule repository 141 (e.g., a set of writing style check lists, restrictions, and recommendations for choosing a correct tone, verb, adjective, name, expression, conventional term, etc.); the threshold repository (e.g., a set of normalization thresholds for different types of PII, software and service domains, and correlated validation scores); and the score table 143 (e.g., one or more tables that list predefined style issues and correlated deduction scores).

At step 710, the IDE 120 detects and extracts a PII message in code. In embodiments, and as described with respect to FIG. 2, the detector module 121 uses automated routines to detect PII messages in source code, and the extractor module 122 uses automated routines to extract the detected PII messages from the source code.

At step 715, the IDE 120 categorizes the extracted PII message. In embodiments, and as described with respect to FIG. 2, the style categorizer 123 categorizes the extracted PII message as one of a plurality of predefined styles, and the type classifier module 124 classifies the extracted PII message as one of a plurality of predefined types.

At step 720, the IDE 120 sends an API call to the server 110. In embodiments, and as described with respect to FIG. 2, the requester module 125 sends an API call to the DWSVNS program 130, the API call including the extracted PII message, the determined style, and the determined type.

At step 725, the server 110 receives the API call of step 720. In embodiments, and as described with respect to FIG. 2, the DWSVNS program 130 receives the API call.

At step 730, the server 110 determines the validation score of the extracted PII message is less than a threshold. In embodiments, and as described with respect to FIG. 2, the validation module 131 determines an overall validation score of the extracted PII module, e.g., based on analysis of validation submodules and the score table 143. In embodiments, and as described with respect to FIG. 2, the validation module 131 compares the determined overall validation score of the extracted PII module to a threshold value from the threshold repository 142. In the event the overall validation score for the extracted PII message is greater than the threshold, then the extracted PII message is deemed to not have any style issues (e.g., no style errors), and the server 110 returns the extracted PII message to the IDE 120. In the event the overall validation score for the extracted PII message is less than the threshold, then the extracted PII message is deemed to have a style issue (e.g., one or more style errors), in which case the process proceeds to step 735.

At step 735, the server 110 generates a modified PII message. In embodiments, and as described with respect to FIG. 2, the normalizer module 132 generates the modified PII message by replacing and/or modifying identified content of the extracted PII message.

At step 740, the server 110 proofreads the modified PII message. In embodiments, and as described with respect to FIG. 2, the proofreader module 133 performs automated proofreading of the modified PII message. In embodiments, step 740 additionally or alternatively includes: presenting the modified PII message to a user via a UI of the IDE 120, and receiving feedback from the user to accept or decline the modified PII message.

At step 745, the server 110 determines whether to accept the modified PII message. In embodiments, and as described with respect to FIG. 2, the decision to accept is made based on the proofreading performed at step 740, e.g., the automated proofreading and/or the user proofreading. If the modified PII message is accepted, then at step 750 the server 110 sends the modified message to the IDE 120. At step 755, the IDE 120 receives the modified PII message from the server 110, and at step 760 the IDE 120 inserts the modified PII message in the code. In embodiments, and as described with respect to FIG. 2, inserting the modified PII message in the code comprises automatically revising the code to replace the extracted PII message with the modified PII message.

In the event the modified PII message is not accepted at step 745, then at step 765 the server 110 adjusts system parameters based on the feedback. In embodiments, and as described with respect to FIG. 2, the feedback module 134 uses machine learning routines to automatically adjust one or more system parameters based on the feedback. In one exemplary embodiment, the system parameters include: rules defined in the rule repository 141 (e.g., that are used to replace content in the modified PII message); threshold values in the threshold repository 142 (e.g., that are used to determine when to generate a modified PII message); scores in the score table 143 (e.g., that are used to determine the overall validation score of an extracted PII message); and rules and/or algorithms in the validation module (e.g., that are used to detect style issues in the extracted PII message).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    obtaining and storing, by a computer device, a service profile defining writing style rules, scoring information, and threshold information;
    receiving, by the computer device, an extracted program integrated information (PII) message from a client device;
    determining, by the computer device, an overall validation score of the extracted PII message is less than a threshold defined by the threshold information;
    generating, by the computer device, a modified PII message by changing content of the extracted PII message; and
    returning, by the computer device, the modified PII message to the client device for replacing the extracted PII message in a source code,
    wherein the writing style rules comprise a set of writing style check lists, restrictions, and recommendations for choosing a correct tone, verb, adjective, name, expression, and conventional term;

the scoring information comprises one or more tables that list predefined style issues and correlated deduction scores; and the threshold information comprises a set of normalization thresholds for different types of PII messages.

2. The method of claim 1, further comprising proofreading the modified PII message prior to the returning the modified PII message to the client device.

3. The method of claim 2 wherein the proofreading comprises at least one selected from the group consisting of:
automated proofreading by a proofreader module of the computer device; and
presenting the modified PII message to a user via the client device and receiving user proofreading input from the client device.

4. The method of claim 1, wherein the extracted PII message is received in an application program interface (API) call from an integrated development environment (IDE) running on the client device.

5. The method of claim 4, wherein the API call includes: the extracted PII message; a determined style of the extracted PII message; and a determined type of the extracted PII message.

6. The method of claim 1, wherein the overall validation score is determined using: validation submodules that are based on the writing style rules; and the scoring information.

7. A computer program product, the computer program product comprising a computer readable storage medium having program instructions embodied therewith, the program instructions executable by a computer device to cause the computer device to:
receive an extracted program integrated information (PII) message from a client device;
determine an overall validation score of the extracted PII message is less than a threshold defined by stored threshold information;
generate a modified PII message by changing content of the extracted PII message;
proofread the modified PII message; and
accept or decline the modified PII message based on the proofreading;
wherein accepting the modified PII message results in the computer device returning the modified PII message to the client device for replacing the extracted PII message in a source code; and
declining the modified PII message results in the computer device adjusting one or more system parameters based on the declining.

8. The computer program product of claim 7, wherein the proofreading comprises at least one selected from the group consisting of:
automated proofreading by a proofreader module of the computer device; and
presenting the modified PII message to a user via the client device and receiving user proofreading input from the client device.

9. The computer program product of claim 7, wherein the extracted PII message is received in an application program interface (API) call from an integrated development environment (IDE) running on the client device.

10. The computer program product of claim 9, wherein the API call includes: the extracted PII message; a determined style of the extracted PII message; and a determined type of the extracted PII message.

11. The computer program product of claim 7, wherein the overall validation score is determined using: validation submodules that are based on the writing style rules; and stored scoring information.

12. The computer program product of claim 7, wherein the one or more system parameters includes at least one selected from a group consisting of:
writing style rules used in generating the modified PII message;
the threshold;
a scoring table used in determining the overall validation score; and
one or more rules used in detecting style issues in the extracted PII message.

13. A system, comprising:
a processor, a computer readable memory, and a computer readable storage medium;
program instructions to store a service profile defining writing style rules, scoring information, and threshold information;
program instructions to receive an extracted program integrated information (PII) message from a client device;
program instructions to determine an overall validation score of the extracted PII message is less than a threshold defined by the threshold information;
program instructions to generate a modified PII message by changing content of the extracted PII message;
program instructions to proofread the modified PII message; and
program instructions to accept or decline the modified PII message based on the proofreading;
wherein accepting the modified PII message results in the computer device returning the modified PII message to the client device for replacing the extracted PII message in a source code;
declining the modified PII message results in the computer device adjusting one or more system parameters based on the declining; and
the program instructions are stored on the computer readable storage medium for execution by the processor via the computer readable memory.

14. The system of claim 13, wherein the proofreading comprises at least one selected from the group consisting of:
automated proofreading by a proofreader module of the computer device; and
presenting the modified PII message to a user via the client device and receiving user proofreading input from the client device.

15. The system of claim 13, wherein the extracted PII message is received in an application program interface (API) call from an integrated development environment (IDE) running on the client device.

16. The system of claim 15, wherein the API call includes: the extracted PII message; a determined style of the extracted PII message; and a determined type of the extracted PII message.

17. The system of claim 13, wherein the overall validation score is determined using: validation submodules that are based on the writing style rules; and stored scoring information.

18. The system of claim 13, wherein the one or more system parameters includes at least one selected from a group consisting of:
the writing style rules used in generating the modified PII message;
the threshold;

the scoring information used in determining the overall validation score; and one or more rules used in detecting style issues in the extracted PII message.

19. The system of claim 18, wherein:

the writing style rules comprise a set of writing style check lists, restrictions, and recommendations for choosing a correct tone, verb, adjective, name, expression, and conventional term;

the scoring information comprises one or more tables that list predefined style issues and correlated deduction scores; and the threshold information comprises a set of normalization thresholds for different types of PII messages.

* * * * *